US008176150B2

(12) United States Patent
Collins et al.

(10) Patent No.: US 8,176,150 B2
(45) Date of Patent: May 8, 2012

(54) AUTOMATED SERVICES PROCUREMENT THROUGH MULTI-STAGE PROCESS

(75) Inventors: Mark Collins, Dripping Springs, TX (US); Subramanian Ganesan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 414 days.

(21) Appl. No.: 12/539,679

(22) Filed: Aug. 12, 2009

(65) Prior Publication Data

US 2011/0040857 A1 Feb. 17, 2011

(51) Int. Cl.
*G06F 15/177* (2006.01)

(52) U.S. Cl. ........ 709/220; 709/223; 709/221; 709/202; 717/174

(58) Field of Classification Search .......... 709/220–224; 717/120, 127, 174–178
See application file for complete search history.

(56) References Cited

U.S. PATENT DOCUMENTS

| | | | |
|---|---|---|---|
| 6,763,458 B1 | 7/2004 | Watanabe et al. |
| 6,946,972 B2 | 9/2005 | Mueller et al. |
| 6,948,099 B1 | 9/2005 | Tallam |
| 6,963,981 B1 | 11/2005 | Bailey et al. |
| 6,965,989 B1 | 11/2005 | Strange et al. |
| 6,970,909 B2 | 11/2005 | Schulzrinne |
| 6,973,569 B1 | 12/2005 | Anderson et al. |
| 6,993,649 B2 | 1/2006 | Hensley |
| 7,013,772 B1 | 3/2006 | Grace, Jr. et al. |
| 7,017,039 B2 | 3/2006 | Hensley |
| 7,043,604 B2 | 5/2006 | Ogasawara et al. |
| 7,093,989 B2 | 8/2006 | Walmsley et al. |
| 7,099,996 B2 | 8/2006 | Ogasawara et al. |
| 7,121,639 B2 | 10/2006 | Plunkett |
| 7,134,007 B2 | 11/2006 | Zimmer et al. |
| 7,146,512 B2 | 12/2006 | Rothman et al. |
| 2005/0138346 A1 | 6/2005 | Cauthron |
| 2005/0144431 A1 | 6/2005 | Lin et al. |
| 2005/0149924 A1 | 7/2005 | Komarla et al. |
| 2005/0207105 A1 | 9/2005 | Davies |
| 2005/0216668 A1 | 9/2005 | Kabayashi et al. |
| 2005/0228903 A1 | 10/2005 | Lerner et al. |
| 2005/0246568 A1 | 11/2005 | Davies |
| 2005/0283575 A1 | 12/2005 | Kabayashi et al. |
| 2006/0004982 A1 | 1/2006 | Matheny |
| 2006/0155837 A1 | 7/2006 | Kobayashi et al. |
| 2006/0218388 A1 | 9/2006 | Zur et al. |

(Continued)

OTHER PUBLICATIONS www.etherboot.org/wiki/start, printed Aug. 24, 2009.

(Continued)

*Primary Examiner* — Abdullahi Salad
(74) *Attorney, Agent, or Firm* — Hamilton & Terrile, LLP; Stephen A. Terrile

(57) ABSTRACT

A system which enables a secure network boot to address customer services offerings. The customer service offerings can include on-demand diagnostics to system reinstallation as well as automatic entitlement validation and service installation. Such a system enables a method of network booting that can be secure from beginning to end, is routable in any network configuration that supports Internet routing, avoids traditional infrastructure requirements thereby making the infrastructure more accessible, is extensible to address scaling requirements, is extensible to EFI technology and can be used on existing BIOS option-ROM implementations, provides a better (i.e., simpler, more secure) customer experience for network boot services, provides a multi-stage architecture that allows numerous service offerings to be obtained once entitlement is validated, and provides for both In-Band (OS operational and booted) and Out-of-Band (OS not operational or not installed) access to remote service capabilities.

14 Claims, 5 Drawing Sheets

U.S. PATENT DOCUMENTS

| | | | |
|---|---|---|---|
| 2006/0236150 | A1 | 10/2006 | Lintz, Jr. et al. |
| 2006/0236198 | A1 | 10/2006 | Lintz, Jr. et al. |
| 2006/0248522 | A1* | 11/2006 | Lakshminarayanan et al. ........ 717/174 |
| 2006/0259291 | A1 | 11/2006 | Dunham et al. |
| 2006/0271775 | A1* | 11/2006 | Zimmer et al. ................. 713/1 |
| 2009/0037551 | A1* | 2/2009 | Gupta ........................ 709/208 |
| 2009/0094350 | A1 | 4/2009 | Rive et al. |
| 2010/0083349 | A1* | 4/2010 | Xiao et al. ..................... 726/1 |
| 2011/0041079 | A1* | 2/2011 | Rive et al. ..................... 715/747 |

OTHER PUBLICATIONS http://www.pix.net/software/pxeboot/archive/pxespec.pdf, Sep. 20, 2009.

www.haifa.ibm.com/projects/storage/iboot/index.html, printed Aug. 24, 2009.

www.emboot.com/products_netBoot-i.htm, printed Aug. 24, 2009.

* cited by examiner

AUTOMATED SERVICES PROCUREMENT THROUGH MULTI-STAGE PROCESS

BACKGROUND OF THE INVENTION

1. Field of the Invention

The present invention relates in general to the field of information handling systems and more particularly to providing automated services procurement via a multi-stage process.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With the proliferation of information handling systems, especially within large scale information handling system installations, an important issue relates to the service and support of the large scale information handling system installations (i.e., installations in which more than a few information handling systems are supported by a single entity). The entity that services and supports such an installation is often referred to as a managed service provider. Managed services, or life-cycle services, generally include deployment services and asset services. More specifically, managed services include some or all of asset deployment and installation services, asset management services (including, e.g., both asset tracking and asset moving services), asset maintenance services and asset retirement services.

A managed service provider provides a customer with an ability to procure, deploy, support and manage information handling system technologies across the life cycle of the information handling systems. Issues relating to managed services include information management and asset utilization while providing quality service delivery and a favorable customer experience.

One issue relating to a managed services environment relates to the use of agents on information handling systems within the managed services environment. With information handling systems within a managed services environment which include agents, if an information handling system is unable to boot or loses its agent installation, often the only way for the information handling system to reinstall the agent is to boot the operating system, return to a services internet portal, download the agent and reinstall the agent on the system.

With the present system, it is not only possible to boot to a remote location but a multi-stage process can be used to install multiple agents based on the services that a customer has purchased and is entitled. This approach can be used whether the system is able or unable to boot the operating system. Furthermore, the boot process can be directed on a stage by stage basis through a dynamic URL re-direction. This gives a services provider the opportunity to enable dynamic and customized services within a company. For instance, an Online Backup and Recovery service could be offered on a company basis. However, in certain instances, say for the accounting department, those services could also include the ability to clone the backup so that it can be reinstalled on a number of system configurations in the event that the main machine is lost due to hardware failure.

SUMMARY OF THE INVENTION

In accordance with the present invention, a system which enables a secure network boot to address customer services offerings is set forth. The customer service offerings can include on-demand diagnostics to system reinstallation as well as automatic entitlement validation and service installation.

Such a system enables a method of network booting that can be secure from beginning to end, is routable in any network configuration that supports Internet routing, avoids traditional infrastructure requirements thereby making the infrastructure more accessible, is extensible to address scaling requirements, is extensible to EFI technology and can be used on existing BIOS option-ROM implementations, provides a better (i.e., simpler, more secure) customer experience for network boot services, provides a multi-stage architecture that allows numerous service offerings to be obtained once entitlement is validated, and provides for both In-Band (OS operational and booted) and Out-of-Band (OS not operational or not installed) access to remote service capabilities.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
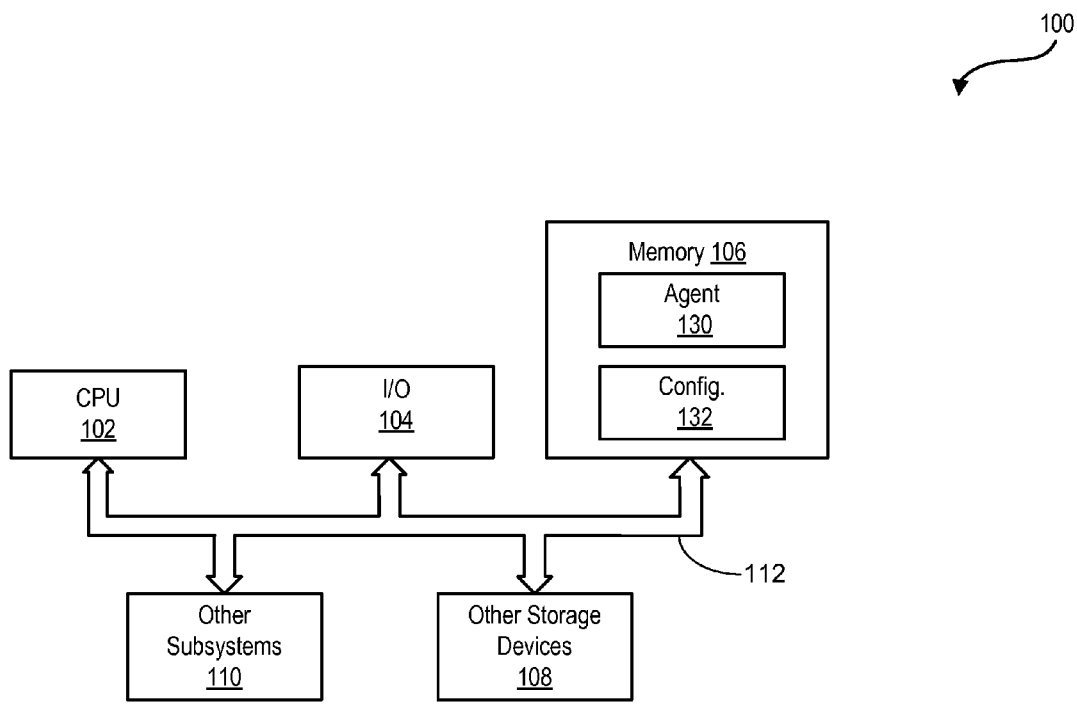
FIG. 1 shows a system block diagram of an information handling system.

Referring briefly to FIG. 1, a system block diagram of a consumer electronics type information handling system 100 is shown. The information handling system 100 includes a processor 102, input/output (I/O) devices 104, such as a display, a keyboard, a mouse, and associated controllers (each of which may be coupled remotely to the information handling system 100), a memory 106 including volatile memory such as random access memory (RAM) and non-volatile memory such as a hard disk and drive, and other storage devices 108, such as an optical disk and drive and other memory devices, and various other subsystems 110, all interconnected via one or more buses 112.

In certain embodiments, the information handling system 100 can further include an agent 130 stored on its memory 106 for execution by its processor 102. Also, in certain embodiments, the information handling system 100 can further include a configuration file 132 stored on its memory 106 for execution by its processor 102.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
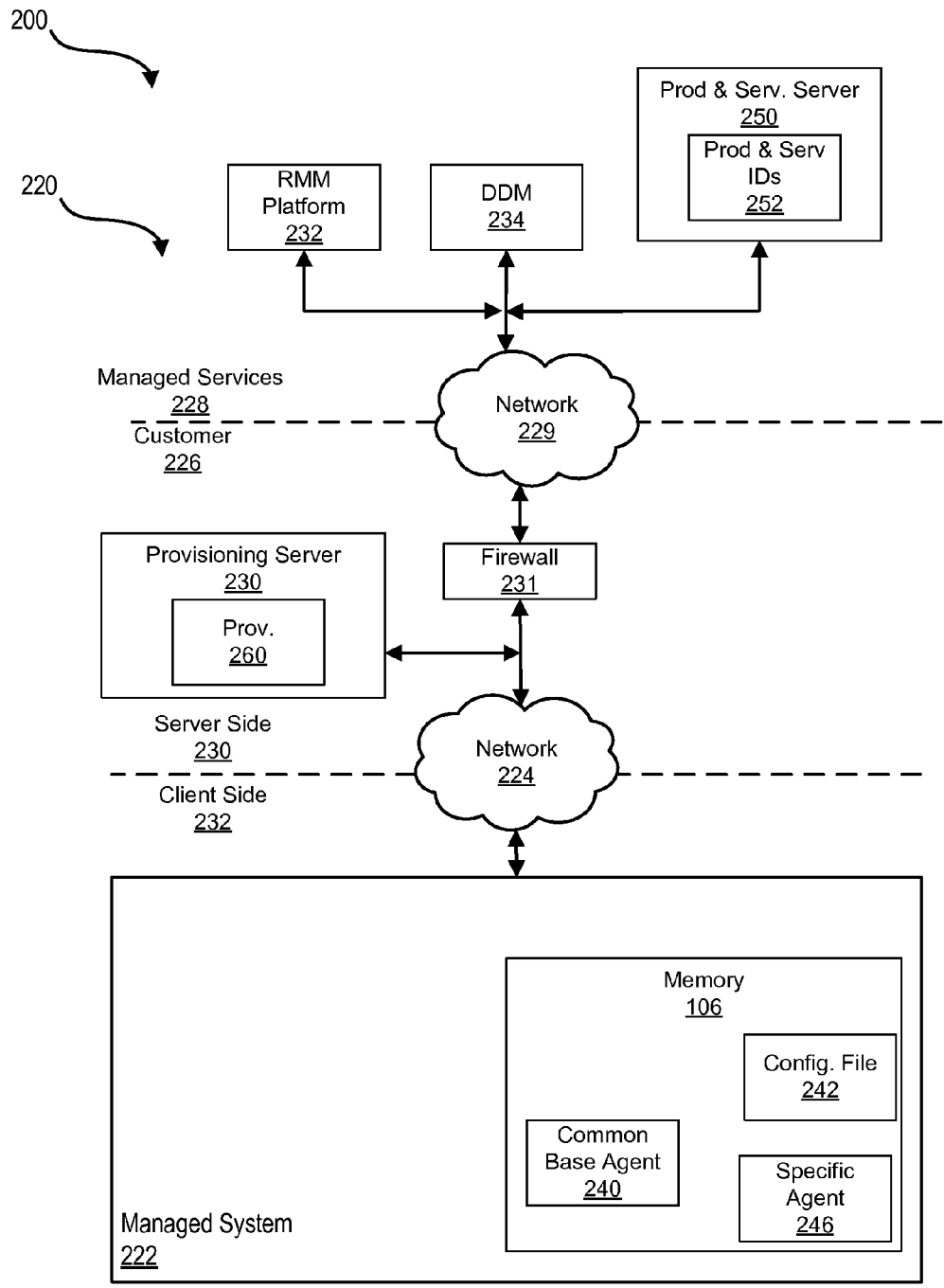
FIG. 2 shows a system block diagram of a managed services environment.

Referring to FIG. 2, a system block diagram of a managed services environment 200 is shown. More specifically, the managed services environment 200 includes a management system 220 as well as at least one managed system 222. The management system 220 and the managed system 222 are coupled via a network 224 such as an Intranet. The management system 220 and the managed system 222 may each be instantiated as one or more information handling systems 100.

The management system 220 includes a customer portion 226 as well as a managed services provider portion 228. The customer portion 226 and the managed services provider portion are coupled via a network 229 such as the Internet.

The customer portion of the management system 220 includes a provisioning server 230. In certain embodiments, the customer portion 226 of the management system 220 can include a fire wall 231.

The managed services provider portion 228 of the management system 220 includes a remote monitoring and management (RMM) platform 232 and a distributed device management (DDM) system 234. The managed services provider portion 228 of the management system 220 also includes a product & services server 250 which stores product & services customer information such as a plurality of product & services customer identifiers 252.

Each managed system 222 includes a common base agent 240, a configuration file 242. The common base agent 240 and the configuration file 242 provide a user specific agent 244 stored within the memory 106. In certain embodiments, these elements may be stored within a read only memory such as a persistent cache type read only memory. Also in certain embodiments, these elements may be embedded or accessed via a BIOS extension of the managed system 222.

Additionally, in certain embodiments, the provisioning server 230 includes a provisioning information portion 260. The provisioning information portion 260 stores provisioning information for the managed systems 222 that are coupled to the management system 220. The provisioning information enables the provisioning server 230 to provide a triage function for when identifying entitlements to which each managed system 222 is entitled. Entitlements can include software and/or services to that a particular customer has obtained from a managed services provider 228. Each managed system 222 may be entitled to some or all entitlements obtained by the customer. For example, a desktop managed system may be entitled to a first subset of customer obtained entitlements whereas a server type managed system may be entitled to a second subset of customer obtained entitlements.

Figure 3A:
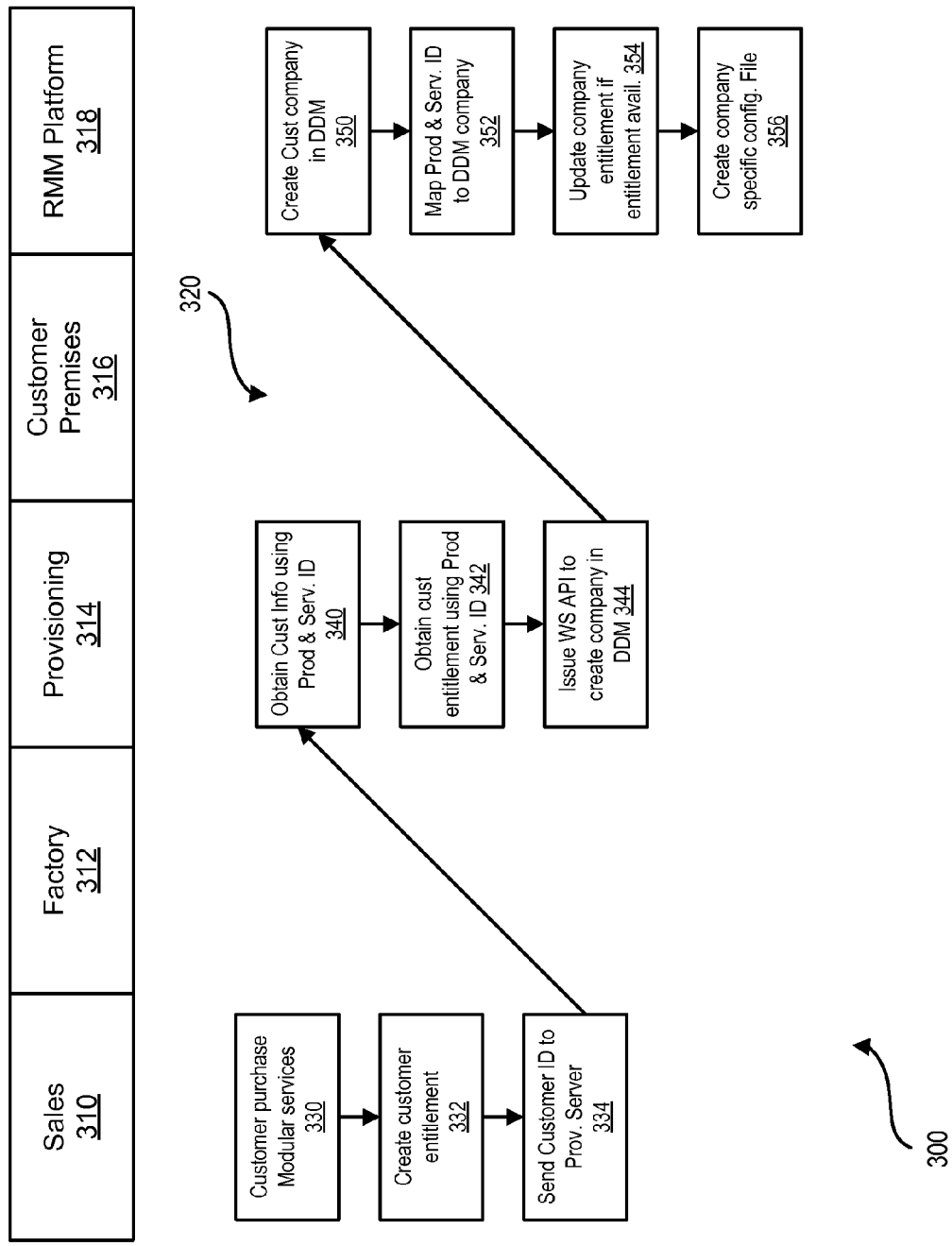
FIGS. 3A and 3B shows flow charts of the operation of a multi-stage factory install process.
Figure 3B:
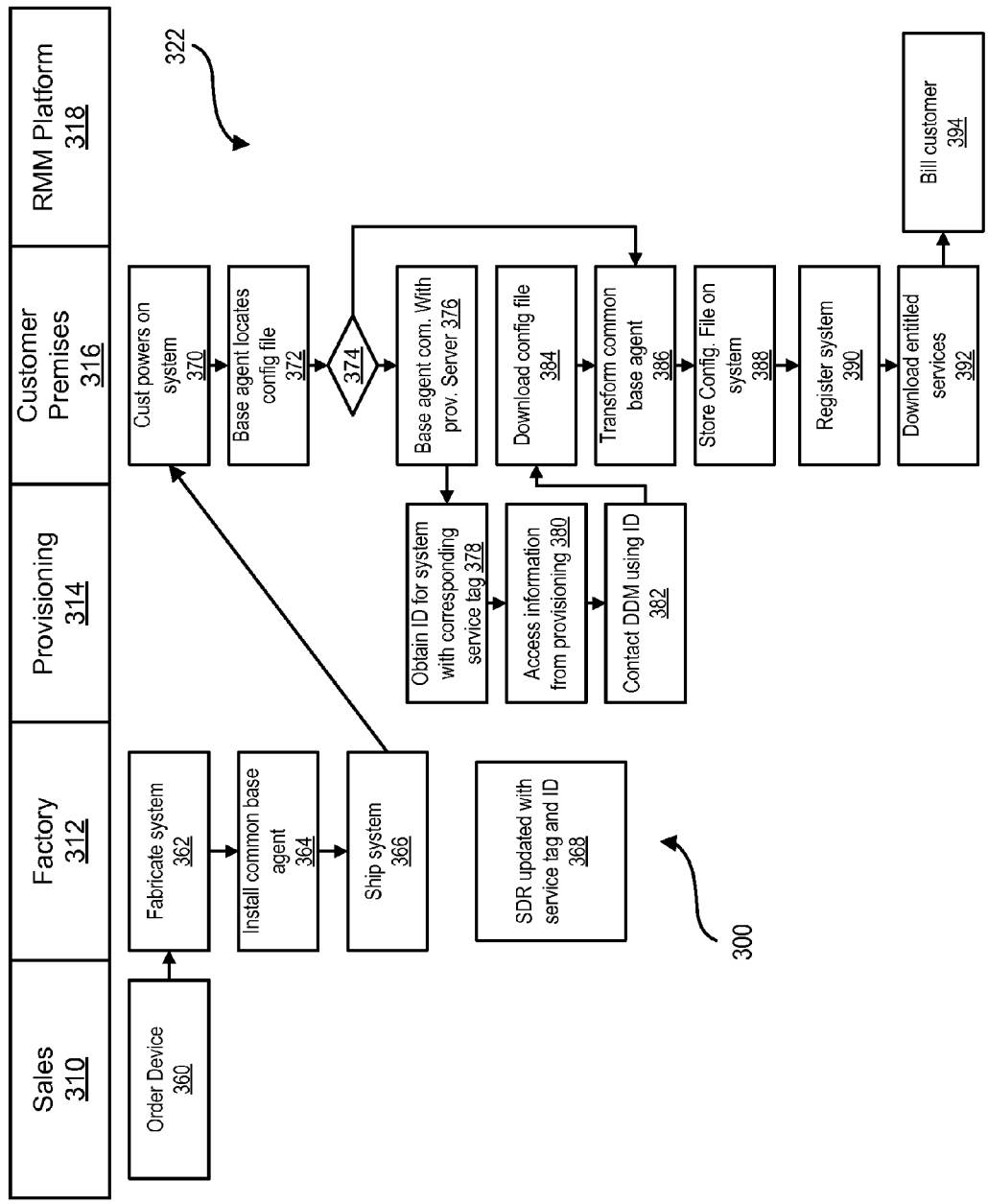

Referring to FIG. 3, a flow chart of the operation of a multi-stage factory install process is shown. The multi-stage factory install process 300 provides for a factory install of a common base agent onto a managed system 222. The multi-stage factory install process 300 includes a sales portion 310, a factory portion 312, a provisioning portion 314, a customer premises portion 316 and a RMM platform portion 318. The multi-stage factory install process 300 may also be conceptualized as including a provisioning stage 320 and an install and configuration stage 322.

More specifically, within the sales portion 310 of the provisioning stage 320, a customer purchases or otherwise acquires modular services at step 330. Next, at step 332 the process 300 creates (or updates) a customer entitlement indication. The customer is also uniquely identified by a product & service customer identifier. Next, at step 334, the customer identifier is provided to a provisioning server 230.

Next, within provisioning portion 314 of the provisioning stage 320, the provisioning server 230 obtains customer information from a product & service catalog server using the product & service customer identifier at step 340. Next, the provisioning server 230 obtains the customer entitlement indication using the product & services customer identifier at step 342. Next, the provisioning server 230 issues a Web Services Application Program Interface (WS-API) to create (or update) company information within the DDM system at step 344.

Next within the RMM Platform portion 318 of the provisioning stage 320, the WS-API is used to create (or update) the customer's company within the DDM system at step 350. Next, at step 352, the multi-stage system 300 maps the product & service customer identifier to the DDM company. Next, at step 354, if an entitlement is available, the company entitlement is updated. Next at step 356, the process 300 creates a company specific configuration file that can be appended to the common base agent fingerprint.

Also, substantially in conjunction with steps that are occurring within the provisioning stage 320, a plurality of steps occur within the install and configuration stage 322. More specifically, within the sales portion 310 of the install and configuration stage 322, a customer orders a device at step 360. Next within the factory portion 332 of the install and configuration stage 322, the device is manufactured at step 362. Next, at step 364, the common base agent 240 is installed onto the managed system 222. Next, the managed system 222 is shipped to the customer at step 366. Also during the factory portion 332 of the install and configuration stage 322 a system descriptor record (SDR) (or other type managed system device specific identifier is updated with a service tag as well as the appropriate product & services customer identifier at step 368.

Next, within the customer premises portion 316 of the install and configuration stage 322, the customer powers on the managed system 222 at step 370. When the managed system 222 is powered on, the base agent 240 of the managed system 222 access a read only memory (e.g., a trusted platform module (TPM), a non-volatile random access memory (NVRAM), or a remote access controller (RAC)) to locate a company configuration file at step 372.

If the company configuration file is not located as determined at step 374, then the base agent 240 communicates with the provisioning server 230 using a unique identifier such as service tag of the managed system at step 376. Next, within the provisioning portion 314 of the install and configuration stage 322, the provisioning server 230 accesses the SDR of the managed system 222 to obtain the product & services customer identifier for the device corresponding to the particular service tag at step 378. If necessary, at step 380, the system can access the information derived from steps 340, 342 and 344. Next, at step 382, the system contacts the DDM 230 using the product & services customer identifier to obtain the customer's company configuration file.

The process flow returns to the customer premises portion 316 of the install and configuration stage 322 at step 384 where the system downloads the configuration file to the managed system 222.

The system then applies the configuration file to transform the common base agent to a company specific base agent at step 386 and stores the configuration file within the read only memory of the managed system 222 at step 388. If the company configuration file is located at step 374, then the system applies the configuration file to transform the common base agent to the company specific base agent at step 386.

Next the company specific agent 246 communicates with the DDM system 234 and registers the device under an appropriate company identifier at step 390. The system then downloads any entitled services software to the managed system 222 at step 392.

Next, within the RMM platform portion 318 of the install and configuration state 322 the system bills the customer for the enabled services at step 394.

Figure 4:
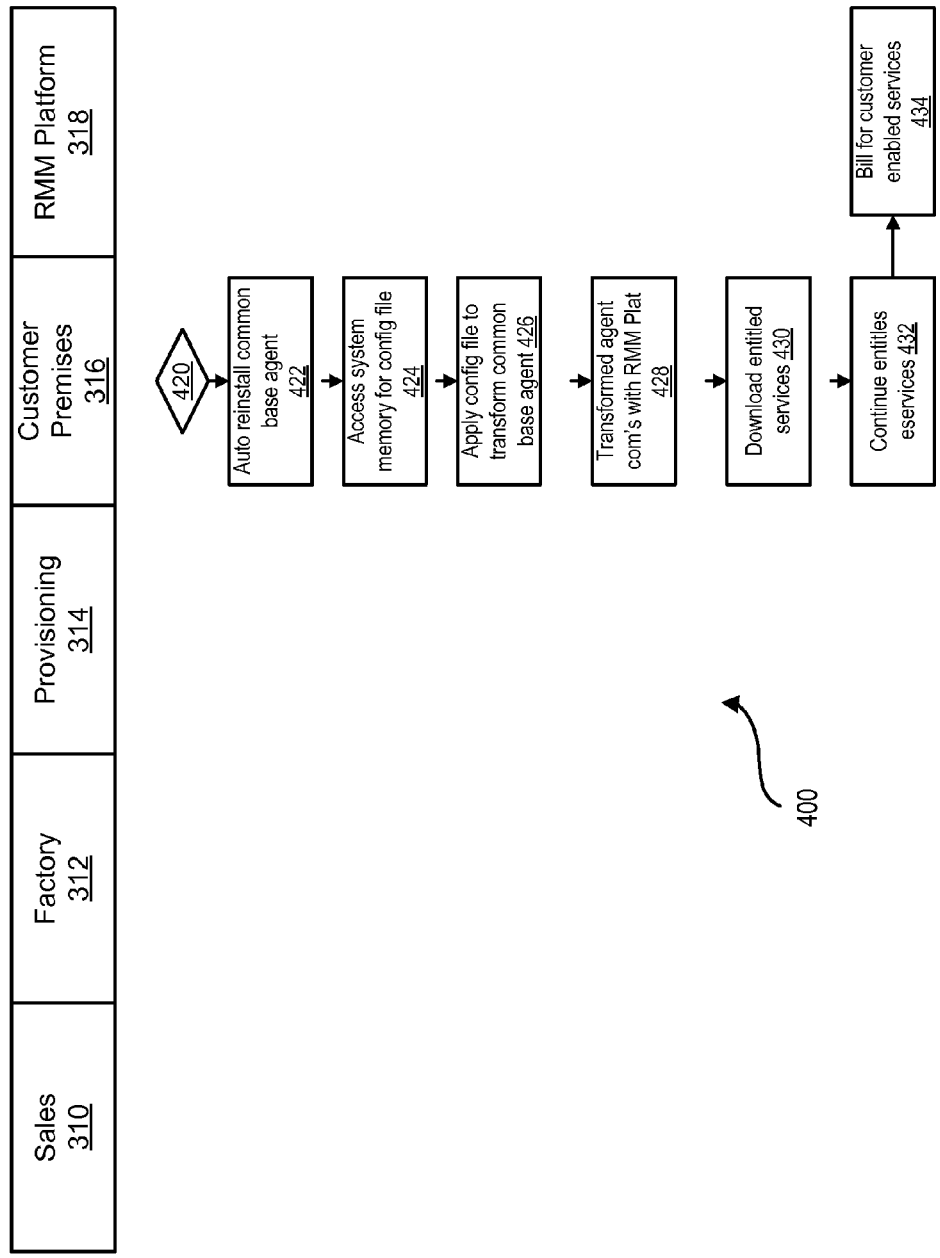
FIG. 4 shows a flow chart of the operation of a multi-stage reinstall process.

Referring to FIG. 4, a flow chart of the operation of a multi-stage reinstall process is shown. The multi-stage factory reinstall process 400 provides for a reinstall of a common base agent onto a managed system 322. The multi-stage reinstall process 400 includes the customer premises portion 316 as well as the RMM platform portion 318. More specifically, the reinstall process 400 starts operation at step 420 when a services agent is determined to be unavailable (e.g., the agent was lost, corrupted or deleted). Next, the reinstall process 400 automatically reinstalls the common base agent from a non-volatile memory stored within the managed system 222 at step 422. In a preferred embodiment, the common base agent is stored within a persistent cache of the managed system 222.

Next the process 400 accesses the read only memory of the managed system to obtain a company configuration file at step 424. Next, the process 400 applies the configuration file to transform the common base agent to become a company specific agent at step 426. Next, the company specific agent communicates with the RMM platform 232 at step 428. Next, the management system 220 downloads entitles services software to the managed system 222 at step 430. The managed system 222 is now able to continue use of the entitled servers at step 432. The RMM platform portion 318 then bills the customer for the enabled services at step 434.

In general, the multi-stage factory install process includes a plurality of novel features. For example, the multi-stage uses a secure HTTP/S transport throughout the network bootstrap process. Also for example, the multi-stage process uses a secure Internet Protocol security (IPSec) transport throughout the network bootstrap process. Also for example, the multi-stage process passes configurable matching identity data (e.g., a ServiceTag, Internet protocol (IP) address, a Media Access Control (MAC) address, a unique user identifier (UUID), and System Management BIOS (SMBIOS) parameters) as part of the network bootstrap process. Also for example, the multi-stage system leverages a manufacturer network services application to reduce configuration complexity. Also for example, the multi-stage system avoids Dynamic Host Configuration Protocol (DHCP) requirements. Also, the multi-stage system enables connection with remote location to determine service offering capability from within the BIOS of the managed system without an operating system boot. Also for example, the multi-stage system allows automatic re-installation of a base agent with no unique identification data from the persistent cache of the managed information handling system. Also for example, the multi-stage system allows download of entitled services software to managed system. Also for example, the multi-stage system enables automatic continuation of entitled services.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, it will be appreciated that various elements of the managed services environment may be easily relocated. E.g., the provisioning server 230 may be located on the managed services provider portion 228 of the management system 220.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for enabling a managed system to determine customer entitlements comprising:
   storing a common base agent on the information handling system;
   storing a configuration file on the information handling system;

combining the common base agent and the configuration file to provide a managed system specific agent, the managed system specific agent identifying entitlements associated with the managed system;

determining whether the managed system specific agent is present when the managed system is booted up;

accessing a provisioning server if the managed system specific agent is not present; and, reinstalling the configuration file from the provisioning server onto the managed system.

2. The method of claim 1 wherein:

the entitlements comprise on-demand diagnostics to system reinstallation as well as automatic entitlement validation and service installation.

3. The method of claim 1 wherein:

the managed system comprises a unique identifier; and, the configuration file determines entitlements based upon the unique identifier.

4. The method of claim 1 wherein:

the provisioning server is included within a management system; and, the management system is coupled to a plurality of managed systems, each of the plurality of managed systems comprising respective configuration files, the respective configuration files identifying respective entitlements.

5. The method of claim 4 wherein:

the management system further comprises a managed services portion, the managed services portion providing the entitlements to each of the plurality of managed systems.

6. The method of claim 4 wherein:

the management system comprises a remote monitoring and management (RMM) platform and a distributed device management (DDM) system.

7. The method of claim 4 wherein:

the management system comprises a product and services server, the product and services server storing product and services customer information, the product and services customer information comprising a plurality of product and services customer identifiers, the plurality of product and services customer identifiers associating particular entitlements with a respective managed system.

8. An apparatus for enabling a managed system to determine customer entitlements comprising:

means for storing a common base agent on the information handling system;

means for storing a configuration file on the information handling system;

means for combining the common base agent and the configuration file to provide a managed system specific agent, the managed system specific agent identifying entitlements associated with the managed system;

means for determining whether the managed system specific agent is present when the managed system is booted up;

means for accessing a provisioning server if the managed system specific agent is not present; and, means for reinstalling the configuration file from the provisioning server onto the managed system.

9. The apparatus of claim 8 wherein:

the entitlements comprise on-demand diagnostics to system reinstallation as well as automatic entitlement validation and service installation.

10. The apparatus of claim 8 wherein:

the managed system comprises a unique identifier; and, the configuration file determines entitlements based upon the unique identifier.

11. The apparatus of claim 8 wherein:

the provisioning server is included within a management system; and, the management system is coupled to a plurality of managed systems, each of the plurality of managed systems comprising respective configuration files, the respective configuration files identifying respective entitlements.

12. The apparatus of claim 11 wherein:

the management system further comprises a managed services portion, the managed services portion providing the entitlements to each of the plurality of managed systems.

13. The apparatus of claim 11 wherein:

the management system comprises a remote monitoring and management (RMM) platform and a distributed device management (DDM) system.

14. The method of claim 11 wherein:

the management system comprises a product and services server, the product and services server storing product and services customer information, the product and services customer information comprising a plurality of product and services customer identifiers, the plurality of product and services customer identifiers associating particular entitlements with a respective managed system.

\* \* \* \* \*